E. HEINZER.
SHOCK ABSORBER.
APPLICATION FILED MAY 3, 1918.

1,277,925.

Patented Sept. 3, 1918.

Inventor
Edward Heinzer

Fitz Gerald & Co.
Attorneys

UNITED STATES PATENT OFFICE.

EDWARD HEINZER, OF ABSECON, NEW JERSEY.

SHOCK-ABSORBER.

1,277,925.

Specification of Letters Patent.

Patented Sept. 3, 1918.

Application filed May 3, 1918. Serial No. 232,355.

*To all whom it may concern:*

Be it known that I, EDWARD HEINZER, a citizen of the United States, residing at Absecon, in the county of Atlantic and State of New Jersey, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers for motor vehicles and its primary object is to simplify, cheapen, and improve the construction and operation of such devices.

A further object is to so construct a shock absorber that it may be readily and easily attached to or detached from the vehicle when occasion requires.

With these objects in view, the invention consists in the improved construction and combination of parts hereinafter fully described and afterward particularly claimed.

Figure 1:
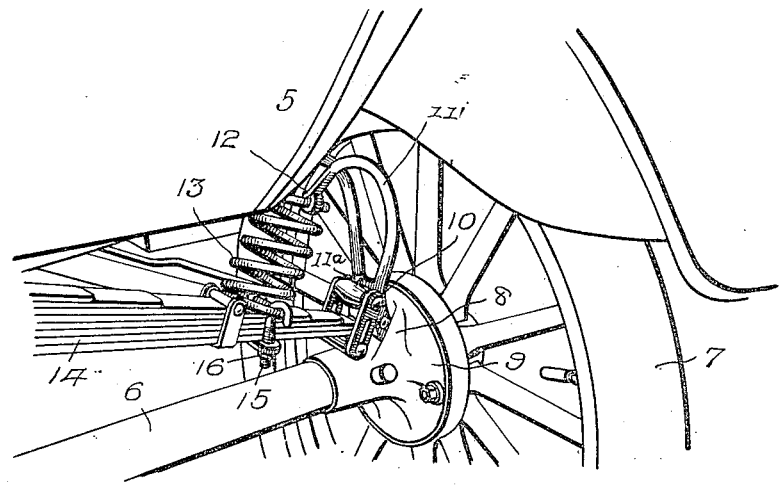
Figure 2:
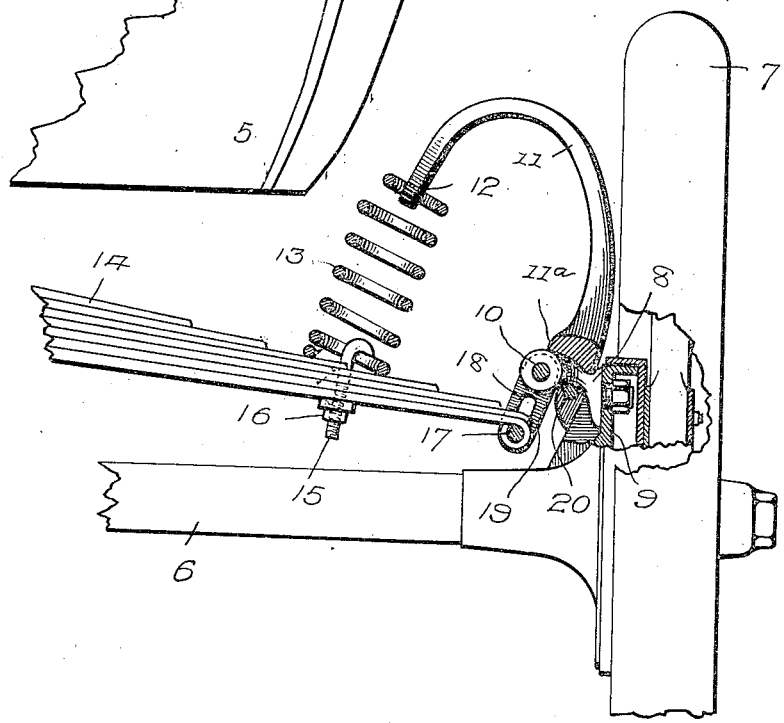

In order that the construction and operation thereof may be readily comprehended, I have illustrated an approved embodiment of my invention in the accompanying drawing, and will now proceed to fully and particularly describe the same in connection with said drawing, in which Figure 1 represents a perspective view of part of an automobile or other motor vehicle, having my improved shock absorber mounted thereon, and, Fig. 2, a view in elevation of substantially the same parts as illustrated in Fig. 1, with parts broken away and parts shown in section.

Like reference characters mark the same parts in both of the figures of the drawing.

Referring specifically to the drawing 5 indicates a part of the body of an automobile of any ordinary or preferred construction, 6 an axle therefor, and 7 a wheel, all of any approved style or construction.

8 indicates a bracket projecting inwardly and upwardly from the hub 9 of the wheel 7 to the end of which at 10 is pivoted a bar hereinafter described. An arm 11 has a head 11ᵃ at its lower end and projects upward from the hub of the wheel and at its upper end is curved inward and downward, being formed at its inner end with an eye 12 to receive the upper coil of a spiral spring 13 which is secured to the ordinary spring 14 of the vehicle by a hook bolt 15 which engages the bottom coil and which is secured by a nut 16 threaded on the bolt below the spring 14 and is adapted to be turned up to press against said spring 14 to tightly hold the spring 13 down in its position.

The outer end of the vehicle spring 14 is engaged around a pin or bolt 17 which projects through a slot 18 in the bar 19 below its pivot 10 which attaches it to the bracket 8 so as to give upward and downward play to the end of the vehicle spring under the influence of sudden shocks and jars.

The head 11ᵃ on the lower end of the arm 11 carries a pin 20 which contacts with and presses upward against the underside of the bracket 8 when the outer end of the bracket is carried downward by the springs.

From the foregoing it will be obvious to those skilled in the art of motor vehicles that in all sudden jars or shocks, the vehicle spring will be relieved of the shock jar and extra pressure by the spring 14.

Having thus fully described my invention what I claim as new and desire to secure by Letters Patent of the United States is:—

1. A shock absorber comprising a bracket arranged to project inwardly and upwardly from the wheel hub, a slotted bar pivotally depending from the extremity of the bracket, and a spiral spring secured to the vehicle spring and connected under the bracket by means of a curved bar.

2. A shock absorber comprising a bracket arranged to project from a wheel hub, a vehicle spring, a slotted bar pivoted to the bracket, a pin carried by the outer end of the vehicle spring and mounted in the slot of the bar, and a spiral spring secured to and bearing upwardly upon the vehicle spring.

3. A shock absorber comprising a bracket arranged to project from a wheel hub, a vehicle spring, a slotted bar pivoted to the bracket, a pin carried by the outer end of the vehicle spring and mounted in the slot of the bar, and a spiral spring secured to and bearing upwardly upon the vehicle spring by means of a curved bar connected to the upper end of the spiral spring and engaging under the bracket at its inner end.

4. The combination of a hub, a bracket projecting inwardly and upwardly therefrom, a slotted bar pivoted to the extremity of the bracket, a vehicle spring, a pin carried at the outer end of the vehicle spring and slidable in the slot of the bar, an upwardly and inwardly curved bar provided with a pin engaging under the bracket and a head bearing on the pivot of the slotted bar, and a spiral spring connecting the vehicle spring with the inner downwardly depending end of the curved bar.

In testimony whereof I have signed my name to this specification in the presence of two subscribing witnesses.

EDWARD HEINZER.

Witnesses:
LAWRENCE McCLOSKEY,
WILLIAM S. WALKER.